Nov. 9, 1971 E. F. HOLDEN 3,618,383
RECIRCULATING FLUID SUPPLY SYSTEM WITH FLOW MEASURING MEANS
Filed Nov. 13, 1969 3 Sheets-Sheet 1

INVENTOR.
EUGENE F. HOLBEN
BY
David D. McKenney
ATTORNEYS

INVENTOR
EUGENE F. HOLBEN

United States Patent Office 3,618,383
Patented Nov. 9, 1971

3,618,383
RECIRCULATING FLUID SUPPLY SYSTEM WITH FLOW MEASURING MEANS
Eugene F. Holben, Haddonfield, N.J. (% Grinnell Corp., 260 W. Exchange St., Providence, R.I. 02901)
Continuation-in-part of application Ser. No. 786,594, Dec. 24, 1968. This application Nov. 13, 1969, Ser. No. 876,498
Int. Cl. G01f 5/00
U.S. Cl. 73—203
21 Claims

ABSTRACT OF THE DISCLOSURE

A recirculating fluid supply system includes a control device for controlling flow in a by-pass portion of the system to provide a measure of the rate of delivery to diesel engine fuel injectors, burners, or other fluid-consumption equipment. A pump supplies fluid from a reservoir to a main conduit and to the by-pass conduit. Fluid is withdrawn from the main conduit through a branch conduit to fluid consuming equipment. The main conduit returns unused fluid to the reservoir. A control device, which is responsive to the rate of fliud flow in the main conduit on both sides of the branch conduit, controls the rate of flow in the by-pass conduit. Fluid flow in the by-pass conduit is supplied to the main conduit at a suitable point whereby fluid flow through the by-pass conduit into the main conduit is at a rate equal to the rate of fluid flow from the main conduit to the fluid consumption equipment. In this manner, a measure of the fluid added through the by-pass conduit is a measure of the fluid consumed.

CROSS-REFERENCE TO OTHER APPLICATIONS

This application is a continuation-in-part of my application Ser. No. 786,594 filed Dec. 24, 1968 and now abandoned.

BACKGROUND AND BRIEF DESCRIPTION OF THE INVENTION

This invention relates to a recirculating fluid supply system having improved means for measuring the rate of delivery of fluid to diesel engine injector nozzles, burners, or other consuming equipment. Recirculating systems are those in which fluid is supplied at a flow rate in excess of consumption, and the excess is recirculated to a reservoir. It is not feasible to measure the supply of fuel to the burners by direct measurement, and some other indirect means of measuring the flow must be employed. The most obvious method would be to measure the rate of supply and the rate of return, and to perform an operation of subtraction to determine the actual rate of delivery to the burner. Alternatively, it has been proposed to maintain a constant supply and to measure only the return flow. However, it is difficult to perform either of these methods of measurement with satisfactory accuracy, since the inaccuracy of measurement of the flow consumed is the ratio of the rate of supply to the rate of consumption, multiplied by the percentage inaccuracy of measurement of the rate of supply.

A more effective proposal is set forth in U.S. Pat No. 2,265,961 to Ziebolz, issued Dec. 9, 1941. According to that patent, fuel is supplied by a pump at constant pressure and at a constant rate of flow to manifold. Unused fuel is returned to the reservoir. A portion of the supply fuel is diverted or by-passed to join the recirculating return flow. The diverted flow is controlled at a constant measure by the supply pump and further is controlled at a rate which maintains the total return flow to the reservoir at a constant rate of flow. As both the supply to the burners and the return to the reservoir are at constant pressures and at constant rates of flow, the rate of flow of the diverted fluid is consequently equal to the rate of consumption by the burners.

This system is theoretically satisfactory, but requires separate pressure-responsive control mechanisms and valves for the return and supply conduits to maintain a constant pressure supply and constant supply and return flows, with the consequence that independent variations in the response of these mechanisms result in inequality of the flows in the burner delivery conduit and by-pass conduit and hence errors in measuring fuel consumed.

The duplication of control systems also adds to the complexity and the expense of the system. The two control systems may be calibrated for equal response prior to installation, but subsequent deviations in response are not readily discernable after the system is installed in the operating environment.

It is the primary object of the present invention to provide an improved recirculating fluid supply system having means for measuring the rate of fluid delivery therefrom in a highly accurate manner, by means having reduced complexity and increased inherent accuracy of response.

Another object is to provide a control device for controlling fluid flow in a conduit as an indication of fluid consumed from a recirculating fluid supply system.

Further objects and advantages of the invention will appear as the following description proceeds.

In accordance with the invention, fluid is supplied by a pump, or by separate pumps, from a reservoir to a main conduit which delivers the fluid to the burners or other fluid-consumption apparatus, and returns any unconsumed fluid to the reservoir. The fluid supply need not have a constant pressure or constant rate of flow, because of the inherent balancing characteristics of the improved system, and this eliminates one source of additional cost and operational error.

The improved measuring system for measuring fuel consumed by the the burners utilizes two orifices of equal area interposed in the main conduit, one on each side of the point at which fuel is withdrawn by burners; and a differential pressure-responsive device or control means measures and positions itself responsive to any difference in the pressure drops across the two orifices. Since the orifices are of equal area, the differential pressures across them will be equal provided that the flow rates through them are the same. The control means is operatively connected with a valve in the by-pass conduit and by positioning itself regulates the by-pass flow which adds fluid to the main conduit at a location in the system between the two orifices to maintain equal rates of flow through the two orifices. It is an inherent feature of the system that the rate of flow in the by-pass conduit will consequently be equal to that in the conduit delivering fluid to the burners or other fluid-consumption means. A flow meter inserted in the by-pass conduit therefore gives an accurate measurement of the amount of fluid being consumed.

The differential pressure-responsive device or control means preferably takes the form of a dual-chamber housing, having a diaphragm or piston in each chamber attached to a common output stem means which is preferably mounted for axial movement. The orifices are formed in the stem, and each interconnects the opposed faces of one of the diaphragms or pistons so that the pressures upstream and downstream of each orifice are applied to the opposed faces of the related diaphragm or piston. By these means the differential pressures across the two orifices are detected by the diaphragms and applied to the stem. The flows through the orifices are in directions to apply the differential pressures in opposite directions, and any difference is expressed as a displacement of the output stem means. The stem means directly operates a valve which controls the rate of flow of fluid through the by-pass conduit. A displacement of the stem opens the control valve until the flow through the by-pass conduit adds sufficient fluid to the main conduit to obtain equal flows through the two orifices and to establish an equilibrium of pressures on the stem. This occurs when the rate at which fluid is added through the by-pass conduit is equal to the rate at which fluid is withdrawn by the fluid consuming device.

The control device may incorporate both the differential pressure-responsive control means and the flow control valve as a single unit, which adds to the convenience, economy, accuracy, and ease of calibration of the system. Also, one or both of the flow detecting orifices need not be integral with the control device if this is not considered desirable in a particular application, and the control valve controlling the by-pass flow may also be separate from the control device.

While the specification concludes with claims particularly pointing out the subject matter which I regard as my invention, it is believed that a clear understanding may be gained from the following detailed description of preferred embodiments of the invention, referring to the accompanying drawings, in which:

Figure 1:
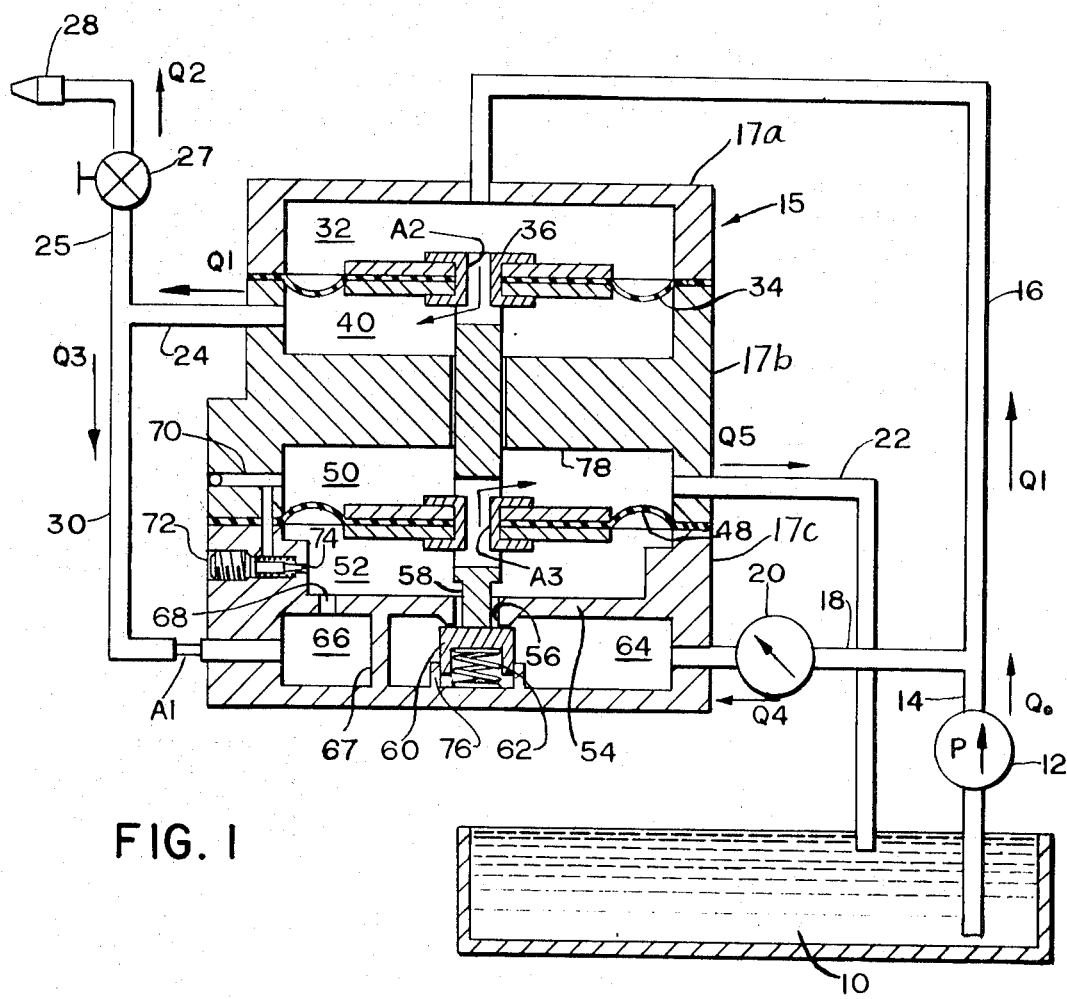
FIG. 1 is a diagrammatic sectional view showing a preferred embodiment of the improved fluid supply system, with a control device, orifice means, and by-pass flow control valve incorporated in an integrated unit.

Referring to FIG. 1, a preferred system is shown schematically. A fuel or other fluid reservoir 10 supplies a pump 12, which is selected to produce the maximum pressure and flow rate which may be required for a particular application of the system. The pump 12 delivers the fluid to a main conduit comprising conduits 14, 16, 24, 30 and 22. By way of illustration, one or more fuel burner or injector nozzles 28 may be supplied with fuel by the system. A delivery conduit 25 connects the main conduit with the nozzles and is contained within a burner manifold (not shown). It is not feasible to measure the fuel flow in the delivery conduit 25 directly. The improved system provides other means for accurately determining the rate and/or quantity of fuel consumed.

The pump 12 and a suction pipe 14 form pressure fluid supply means. The pump 12 delivers fuel to a supply conduit 16 and to a by-pass conduit 18. A conventional flow meter 20 in the by-pass conduit provides an accurate measure of the rate of delivery from the conduit 25, for reasons that will appear hereinafter.

An integrated control device 15 comprises stacked elements 17a, 17b, and 17c having annular recesses. The elements 17a, 17b and 17c are separated by flexible annular diaphragms 34 and 48 to form a series of fluid chambers. An output stem 36 extends through these chambers and is connected to the diaphragms to express a comparison of differential pressures as an axial displacement of the stem. The stem has an extension 58 to control the position of a valve 60 relative to a port 56 formed through a transverse partition 54. The valve 60 is slidably received in a recessed chamber 76 to avoid application of a pressure force by the flow through the port 56, which would tend to close the valve. In order to provide a point of reference for the forces acting on the stem 36, a compression spring 62 is provided to bias the stem to a point with the valve 60 closing the port 56. The by-pass conduit 18 discharges into a chamber 64 separated from pressure comparison chambers by the partition 54. Thus, the rate of flow Q4 through the by-pass conduit 18 and the port 56 is controlled by the position of the output stem 36.

The element 17a and the diaphragm 34 of the control device 15 form an upper chamber 32 into which the supply conduit 16 discharges its flow Q1. The element 17b and the diaphragm 34 form a second chamber 40, with the diaphragm 34 positioned between the two chambers and a different surface of the diaphragm 34 facing the two chambers 32 and 40. The flow Q1 may flow from the chamber 32 into the chamber 40 only through an orifice A2 which is formed in the top end of the stem 36 and communicates with the chambers 32 and 40. Because of a restriction to fluid flow offered by the orifice A2, a differential pressure is exerted against the diaphragm 34 in a downward direction, and the amount of pressure depends upon the pressure drop through the orifice A2. Consequently, the differential pressure exerted against the diaphragm 34 is proportionate to the rate of flow Q1 through the orifice A2. This flow is conducted from the chamber 40 through a conduit or pipe 24, which is in effect an extension of the supply conduit 16.

The fluid through the pipe 24 passes the flow Q1 to the delivery conduit 25 and to a return conduit 30, dividing the flow Q1 into flows Q2 and Q3. The flow Q2 is discharged through the burner, or injector nozzles 28, and the rate of this flow is controlled by a conventional combustion control valve 27, which is shown as a manually operable valve but may be automatically controlled in a conventional manner which is well understood in the art. The flow Q3 represents that portion of the flow Q1 which is not delivered through the burner nozzles, and is recirculated back to the reservoir 10. The return conduit 30 may include an orifice A1 if this is an integral part of the burner manifold construction (not shown), but this orifice is not essential. The return flow Q3 is delivered to a chamber 66 defined within the control device 15 by the partition 54, and subdivided from the chamber 64 by a wall 67. The flow Q3 is then discharged into the chamber 52, which is formed by the element 17c and one face of the diaphragm 48, through an opening 68 in the partition 54.

In the chamber 52, the return flow Q3 and the by-pass flow Q4 unite to form a discharge flow Q5. A further chamber 50 is formed by the element 17b and the other face of the flexible annular diaphragm 48, and the flow Q5 passes into the chamber 50 through an orifice A3 formed through the lower portion of the stem 36 in a manner to provide communication between the chamber to provide communication between the chambers 52 and 50. A small portion of the flow Q5 is passed through an orifice 74 and a passage 70 between the chambers 52 and 50 for adjustment purposes. The orifice is controlled by an adjustable needle valve 72. The flow Q5 then passes from the control device to the discharge conduit 22, by which it is returned to the reservoir 10. Hereinafter, reference to flow through the orifice A3 will be understood to include flow through the orifice 74.

A differential pressure is exerted against the diaphragm 48 in an upward direction in proportion to the pressure drop taking place in the flow Q5 as it passes through the orifices A3 and 74. This pressure drop is in turn proportional to the rate of the flow Q5.

The stem 36 is freely, but sealingly, slidable through a partition 78 which separates the chambers 40 and 50. The stem is subject to a net downward pressure by the diaphragm 34, which represents the rate of flow Q1 through the orifice A2; and is also subject to a net upward pressure by the diaphragm 48, which represents the rate of flow Q5 through the orifices A3 and 74. The net pressure on the diaphragm 34 is downward because of the direction of fluid flow through the orifice A2, and the net pressure on the diaphragm 48 is upward because of the direction of fluid flow through the orifice A3. The cross-sectional areas of the orifices A2 and A3 are preferably made nearly identical, with the orifices 74 being of a size to equate the orifice A2 precisely with the sum of the areas of A3 and 74, by adjustment of the needle valve 72. The differential pressure across the diaphragms 34 and 38 will be equal if the orifice areas are equal, and the rates of flow Q1 and Q5 are equal. Alternatively, it would be feasible to use substantially different cross-sectional areas in the orifices A2 and A3, but the effective areas of the diaphragms 34 and 48 would have to be appropriately proportioned to achieve a balanced condition when the flow rates Q1 and Q5 are equal. Such a variation would add complexity and a potential source of inaccuracy to the system, without offsetting benefits.

The stem 36 is shown in a neutral position, in which there is no flow Q3 to the burners and Q1 equals Q3 equals Q5. The opposed differential pressure exerted by the diaphragms 34 and 48 are the same; and the valve 60 is consequently closed. When flow Q5 occurs, the pressure in the chamber 40 drops thereby increasing the differential pressure on the diaphragm 34 in a downward direction. This moves the stem 36 in a direction to open valve 60 sufficiently to permit fluid to flow through the port 56 to increase the flow through the orifice A3 and to cause an increase in the differential pressure on the diaphragm 48 and re-establish the balance of forces on the stem 36.

It is inherent in the arrangement of the conduits that Q1 is equal to the sum of Q3 plus Q2; and also that Q5 is equal to the sum of Q3 plus Q4. By subtracting these equations, it will be seen that Q1 minus Q5 is equal to Q2 minus Q4. Therefore Q2, the flow delivered to the burner 28, will be equal to the by-pass flow Q4 on condition that the discharge flow Q5 is maintained equal to the supply flow Q1. The system maintains this condition by controlling the addendum Q4 to the flow Q5 in response to the comparison between the rates of flows Q1 and Q5. Whenever a change occurs in the supply flow Q1 due to a change in the delivery flow Q2, the system will immediately rebalance to restore the equality of Q1 and Q5 by an appropriate change in the by-pass flow Q4. Since the system employs an incompressible hydraulic medium, these responses are immediate.

Assume, for example, that there is an increase in the rate of the supply flow Q1 though a change in the pumping pressure without a change in fluid consumption. This creates an increased pressure differential acting downwardly against the diaphragm 34. Since the fluid consumption remains unchanged and the fluid is incompressible, a corresponding increase in differential pressure will occur acting upwardly against the diaphragm 48. That is, the same increase in flow will occur through the orifices A2 and A3, and the changes in the differential pressures across the corresponding diaphragms will be equal. As a result, there will be no change in the net forces on the stem 36. Or, assume that the rate of the delivery flow Q2 is increased by opening the valve 27; the resulting reduction in the rate of the return flow Q3 decreases the differential pressure exerted upwardly against the diaphragm 48. This results in a downward displacement of the stem 36 to open the valve 60, and correspondingly to provide a by-pass flow Q4 which is great enough to restore the equality of Q5 and Q1. Similarly, a decrease in the delivery flow Q2 tends to close the valve 60 and decrease the flow Q4 enough to maintain Q5 in balance with Q1.

To summarize the principle of operation of the control device, the pressure drops across equal orifices located in the supply and discharge conduits for a fuel consuming device are compared, and the by-pass flow Q4 is controlled to maintain these pressure drops equal, thereby maintaining the discharge flow Q5 equal to the supply flow Q1. From this it inherently flows that the flow Q4 in the by-pass conduit must be equal to the flow Q2 consumed by the burners. The by-pass flow is readily measurable in an accurate manner by a flow meter 20 placed in the by-pass conduit.

In designing the control means, it is desirable to have a high gain in the metered line. This would be obtained by having a large port 56 in the metered line, a low gradient spring 62, and large diameter, slack diaphragms 34 and 48 to respond quickly to load changes. The spring force is compensated for in the design so that the total force balance on the stem 36 is zero for equal flows through the orifices A2 and A3.

As noted above, the control means 15 is a device for comparing the pressure drops in two fluid conduits for the purpose of controlling fluid flow in a third fluid conduit. The design or configuration of the control means may be varied from the preferred arrangement disclosed in FIG. 1 while still accomplishing the stated function and result. For example, although not shown in the drawings, it will be appreciated that the control valve 60 may be physically relocated and positioned on the stem means 36 between the two diaphragms 34 and 48, whereby only a relative position of the diaphragms and the control valve are changed on the stem 36 with no functional change. Such a position change may have advantages in ease of construction or in making external connections to the control means 15 in certain cases.

Another variation in the configuration of the control means 15 within the scope of the present invention would be to compare the pressure drops across the orifices by a stem means arranged as a lever and wherein the differential pressure drops across the orifices in the two conduits would be applied in opposing relation at points along opposite ends of the pivoted lever member. In this arrangement the resulting rotation of movement of the stem means or lever provides a difference force to directly or indirectly position and control the control valve.

Figure 2:
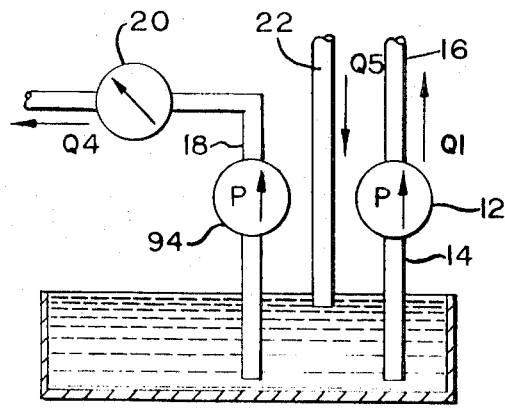
FIG. 2 is a fragmentary diagrammatic sectional view showing a modification of a portion of the system of FIG. 2.

A modification of the system is shown in FIG. 2, in which parts corresponding to those of FIG. 1 are similarly numbered, and those portions which are unchanged are not shown. In this case the by-pass flow Q4 is obtained directly from the reservoir 10. The by-pass condiut 18 is supplied by a pump 94 separate from the pump 12, which furnishes the supply flow Q1 from an intake pipe 14. The pump 94 need not be a positive displacement type, since the flow rate Q4 varies according to the opening of the valve 60.

Figure 3:
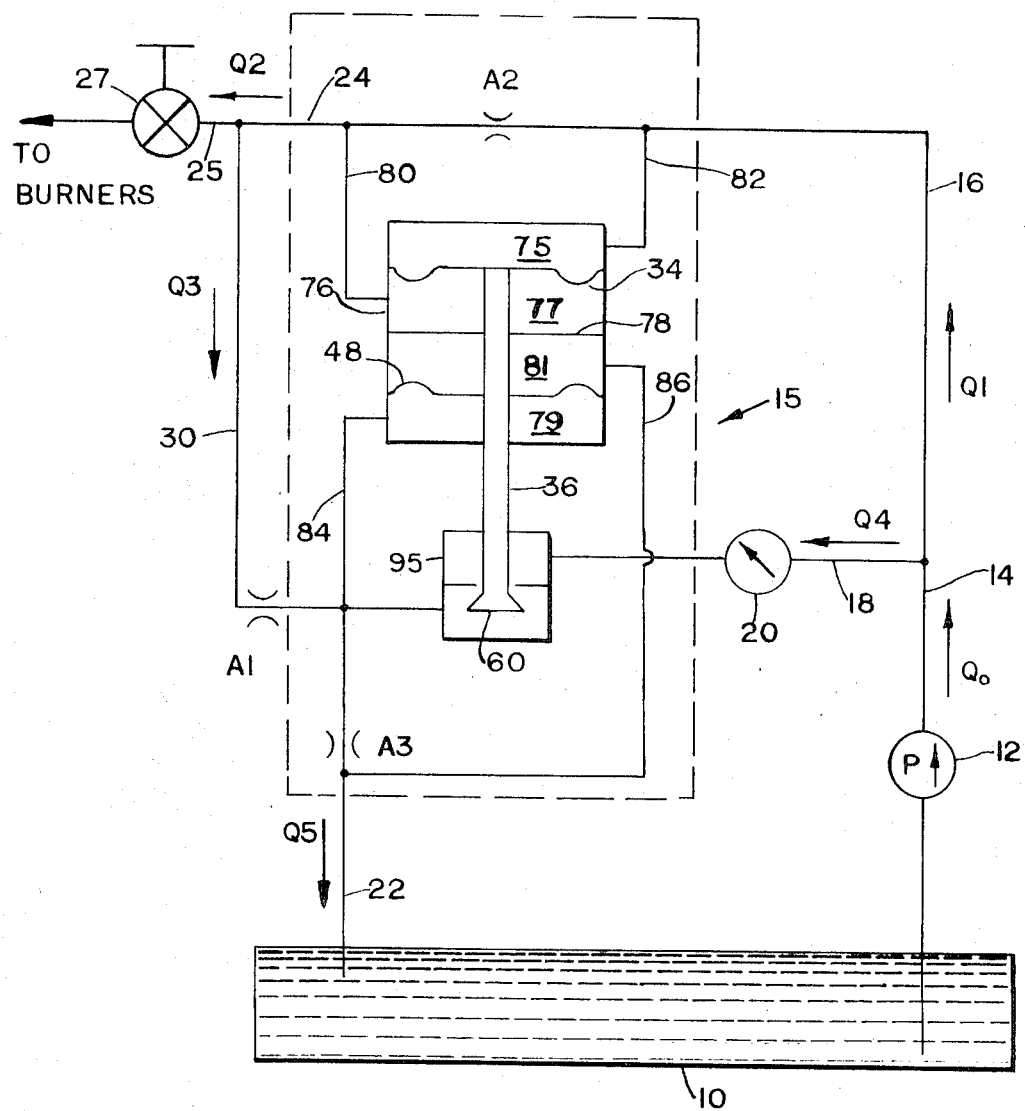
FIG. 3 is a diagrammatic view of another modification, in which control means, orifice means, and by-pass control valve are separate elements of the system.

A further modification is shown in FIG. 3, in which the orifice means A2, A3 and the control valve 60 are not incorporated into a single control unit with the differential-pressure responsive system comprising the diaphragms 34 and 48 and their chambers. These elements are, however, grouped to form the control device 15. The orifices A2 and A3 are placed directly in the supply conduit 16 and the discharge conduit 22, respectively. The pressures upstream and downstream of the orifice A2 are picked up by branch conduits 82 and 80, respectively, and delivered to a first pair of closed chambers 75 and 77 defined within a control stack 76 by the diaphragm 34. The pressures upstream and downstream of the orifice A3 are picked up by branch conduits 84 and 86, respectively, and delivered to a second pair of closed chambers 79 and 81 defined within the control stack below and above a diaphragm 48, respectively. The two pairs of chambers are isolated by a transverse partition 78 within the control stack. The stem 36 is connected to both of the diaphragms 34 and 48, and is freely slidable through the partition 78 and the bottom wall of the stack. The stem 36 controls the position of a valve member 60 contained within a valve housing 95 inserted in the by-pass conduit 18. A review of the previously-given description of the operation of the system of FIG. 1 will disclose that the system shown in FIG. 3 operates in substantially the same fashion to produce the same results.

As indicated above, the control valve 60 is not incorporated into a single unit with the differential-pressure responsive system in the modification of FIG. 3. With this arrangement it would be feasible and desirable for certain application of the present invention to interpose means for increasing the control force operating and positioning the valve member 60 in the stem 36 between the differential-pressure responsive system and the valve 60. Such means may comprise a pneumatic or hydraulic pilot valve, or an electrical position responsive means, coupled with operating a controller which in turn operates the valve 60, thereby monitoring and reliably multiplying the difference between the differential-pressures of diaphragms 34 and 48 as expressed by the stem means 36 for operation of the control valve 60.

Figure 4:
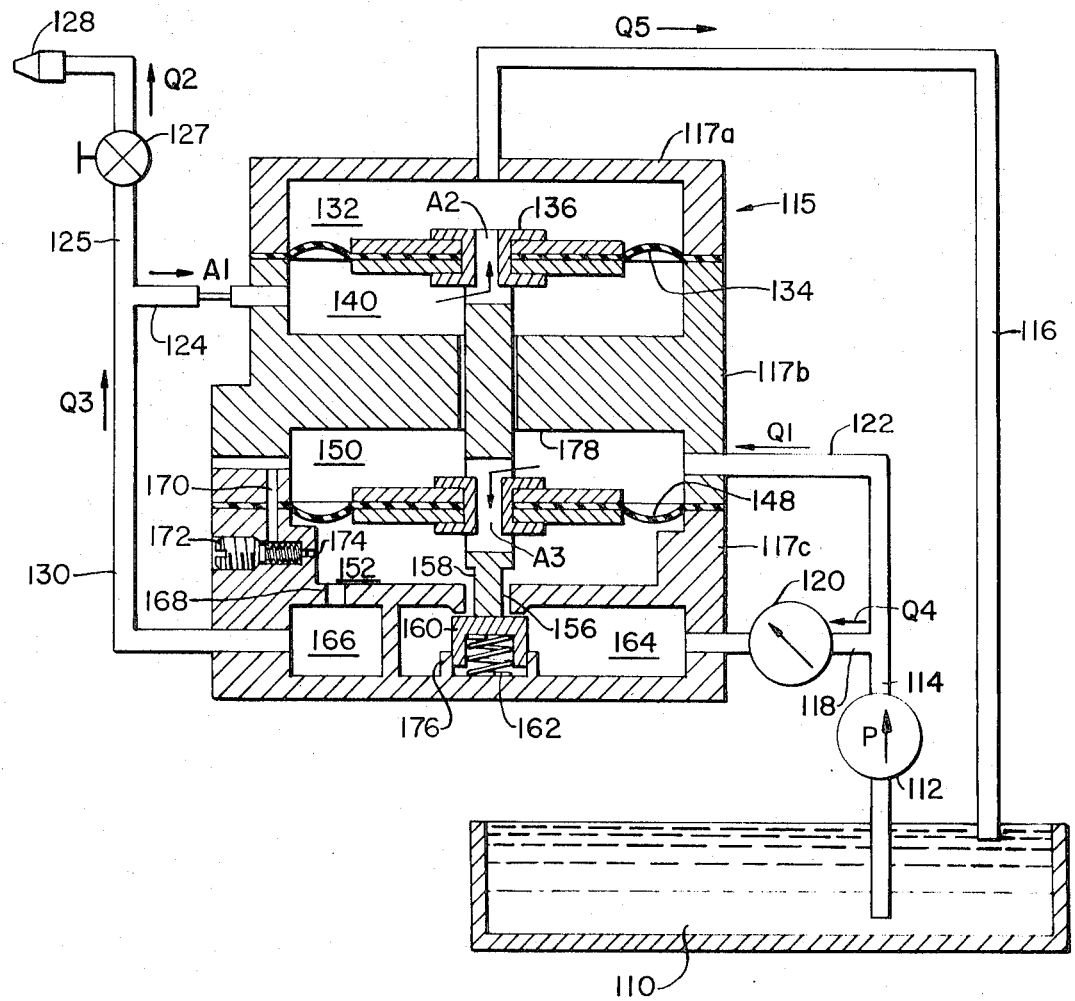
FIG. 4 is a view similar to FIG. 1 but showing a modification in the flow through control device, orifice means and by-pass flow control valve.

A further modification of the recirculating fluid supply system of FIG. 1 is shown in FIG. 4, in which the by-pass flow Q4 is added to the flow Q1 immediately following the orifice A3 and on the burner side of the manifold orifice A1. In this modification, fluid flow Q2 to the burners is made up by an equal flow of Q4 through the by-pass conduit. The meter 120 provides an accurate measure of the burner consumption Q2 by measuring the flow Q4 through the by-pass conduit.

The modification of FIG. 4 has an advantage over the arrangement of FIG. 1 in that in FIG. 1 the fluid pressure at the burner valve 27 decreases as fuel consumption increases and the pump capacity requirements are $Q2+Q3+Q4$, or (since $Q4=Q2$) $Q3+2Q2$; whereas in the FIG. 4 modification, the fluid pressure at the burner valve 127 remains constant and the pump requirements are $Q1+Q2$.

In FIG. 4, at no Q2 flow to the burner, fuel flows from the pump 112 to conduit 114, to conduit 122, to chamber 150, through orifice A3 (and the orifice 174), to chamber 152, to chamber 166, to conduit 130, to conduit 124, through orifice A2, to chamber 132, to conduit 116, and returns to the reservoir 110. The flows through the two orifices A3 and A2 are the same. Therefore, the opposed differential pressures acting on the equal diaphragms 148 and 134 are equal and produce no net force on the stem 136. Valve 160 remains closed. As the burners take fuel, flow Q2 increases. This tends to decrease fluid flow through the orifice A2 which causes the stem 136 to move and to open valve 160. This admits high pressure fluid to the chamber 152 at the rate such that the flow through the orifices A3 and A2 are equal and the pressure differentials are re-established. In the FIG. 4 modifications, as in FIG. 1, any change in the pump 112 pressure or flow not associated with an increase in fuel consumption by the burners will not cause a change in the flow in the by-pass conduit 118 and it will be seen that the measuring device is independent of such variations.

It should be noted that it is not essential to use the orifices A2 and A3 or to determine their relative pressure drops in order to compare the rates of the flows Q1 and Q5. The rates of flow can be measured by other means, such as flow meters, if they are combined with a device which fulfills the function of the control means 15, comparing these rates of flow and controlling the by-pass flow Q4 to maintain the flows Q1 and Q5 equal. Further variations and modifications will readily occur to those skilled in the art without departing from the true spirit and scope of the invention, which I therefore intend to define in the appended claims without limitation to the details of the illustrated embodiments.

I claim:

1. A recirculating fluid supply system for a fluid consumption apparatus comprising, a fluid supply, supply conduit means for receiving fluid from said fluid supply and delivering said fluid to said fluid consumption apparatus, return conduit means for returning unconsumed fluid from said apparatus to said fluid supply, by-pass conduit means for receiving fluid from said fluid supply and delivering said fluid through a discharge connection to one of said supply and discharge conduits, said by-pass conduit means by-passing at least a portion of said supply conduit means, valve means in said by-pass conduit for controlling fluid flow therethrough, means for measuring the rate of fluid flow in said by-pass conduit means, control means constructed and arranged for producing a valve operating movement responsive to the difference in the rates of flow in said by-passed portion of said supply conduit means and in said return conduit means downstream of said discharge connection of said by-pass conduit, said control means being operatively connected to said valve means thereby to control the rate of fluid flow through said by-pass conduit at a rate equal to the rate of consumption by said apparatus.

2. A fluid supply system as recited in claim 1, in which said fluid supply means comprises a reservoir and a pump connected to receive fluid from said reservoir and to discharge to said supply and by-pass conduit means.

3. A fluid supply system as recited in claim 1, in which said fluid supply comprises a reservoir and separate pumps connected to receive fluid from said reservoir and to discharge fluid to said supply conduit and said by-pass conduit, respectively.

4. A system according to claim 1, in which said control means includes means forming a pair of orifices, one of said orifices being in said supply conduit and the other orifice being in said return conduit, and further includes pressure-responsive means constructed and arranged to compare the fluid pressure drops across said orifices and responsive to differences between said fluid pressure drops to control said valve means.

5. A system according to claim 1, in which said by-pass conduit discharges into said supply conduit.

6. A system as recited in claim 1, in which said control means comprises a first orifice in said by-passed portion of said supply conduit and a second orifice in said return conduit, and further comprises a plurality of expansible chambers including a first pair separated by a first flexible diaphragm, and a second pair separated by a second flexible diaphragm; one chamber of said first pair communicating with said by-passed portion of said supply conduit upstream of said first orifice and the other chamber communicating with said by-passed portion of said supply conduit downstream of said first orifice, said first pair being arranged to exert a differential pressure against said first diaphragm in proportion to the pressure drop across said first orifice; one chamber of said second pair communicating with said return conduit upstream of said second orifice and the other chamber communicating with said return conduit downstream of said second orifice, said second pair being arranged to exert a differential pressure against said second diaphragm in proportion to the pressure drop across said second orifice; and output means constructed and arranged to control said valve means in response to displacements of said diaphragms, said output means acting on said valve means in a sense to increase the flow in said by-pass conduit in response to a relative increase in the pressure drop across said first orifice, and to decrease the flow in said by-pass conduit in response to a relative increase in the pressure drop across said second orifice, thereby to equalize said pressure drops.

7. A system as recited in claim 6, said first pair of chambers being serially connected by said first orifice in said supply conduit means, and said second pair of chambers being serially connected by said second orifice in said return conduit means.

8. A system as recited in claim 6, said chambers being arranged so that said differential pressures act in opposite directions against said first and second diaphragms, said output means being connected to said diaphragms and movable thereby so that the position of said output means is related to the difference between the differential pressure drops acting on said diaphragms.

9. A system as recited in claim 8, said output means comprising a unitary control stem.

10. A system as recited in claim 9, said first and second orifices being formed in said control stem and respectively serially connecting said first and said second pairs of chambers.

11. A recirculating fluid supply system including means for measuring the rate of fluid consumed therefrom, comprising a fluid reservoir, a supply conduit, a by-pass conduit, means for supplying fluid under pressure from said reservoir to said supply and by-pass conduits, a delivery conduit and a return conduit, a discharge conduit connected to receive fluid from said return and by-pass conduits for discharge to said reservoir, whereby a portion of a flow of fluid from said supply means can be diverted from said supply conduit and passed directly to said discharge conduit through said by-pass conduit, the remaining portion of said flow being divided to pass between said delivery and return conduits, valve means in said by-pass conduit for controlling the rate of fluid flow by-passed thereby, control means constructed and arranged for determining the relative rates of flow in said discharge and supply conduits and operatively connected with said valve means to maintain the rates of flow in said discharge and supply conduits equal by controlling the rate of flow diverted through said by-pass conduit to said discharge conduit, and means for measuring the rate of fluid flow in said by-pass conduit means as a measure of the rate of fluid consumed through said delivery conduit.

12. A by-pass flow control device for a recirculating fluid supply system in which fluid is supplied from a fluid source through a supply conduit to a fluid consumption device at a rate in excess of consumption and excess fluid is returned through a return conduit to the fluid source, comprising a body member, a first fluid passage in said body member having inlet and outlet openings adapted for connection in said supply conduit, a second fluid passage in said body member having inlet and outlet openings adapted for connection in said return conduit, a by-pass fluid passage in said body member having an inlet opening adapted for receiving fluid from said fluid supply, valve means for controlling fluid flow through said by-pass fluid passage, first means for producing a force tending to open said valve responsive to fluid flow through said first fluid passage, second means for producing a force tending to close said valve responsive to fluid flow through said second fluid passage, said by-pass fluid passage defining an outlet communicating with one of said first and second fluid passages on one side of said flow responsive means associated with said one passage, said one side being the side closest to said consumption device when said control device is connected in said fluid supply system, said means for producing said first and said second forces includes orifices positioned in said first and said second fluid passages and further include diaphragms having surfaces in fluid communication with respective fluid passages on opposite sides of said respective orifices.

13. A flow control device according to claim 12, in which said orifices and said diaphragms are of equal size.

14. A flow control device according to claim 12, in which said orifices are of substantially equal size, and means are provided in parallel with one of said orifice for by-passing a portion of the fluid flow around said one orifice to produce equal pressure drops across said orifices for equal fluid flow through said first and said second fluid passages.

15. A flow control device according to claim 12, in which said diaphragms are positioned across said fluid passages and said orifices are formed in said stem and communicate with opposite sides of said diaphragms.

16. A by-pass flow control device as recited in claim 12, in which said by-pass fluid passage defines an outlet communicating with said first passage on the downstream side of said orifice therein.

17. A by-pass flow control device as recited in claim 12, in which said by-pass fluid passage defines an outlet communicating with said second passage on the upstream side of said orifice therein.

18. A by-pass flow control device for a recirculating fluid supply system in which fluid is supplied from a fluid source through a supply conduit to a fluid consumption device at a rate in excess of consumption and excess fluid is returned through a return conduit to the fluid source, comprising a body member, a first fluid passage in said body member having inlet and outlet openings adapted for connection in said supply conduit, a second fluid passage in said body member having inlet and outlet openings adapted for connection in said return conduit, a by-pass fluid passage in said body member having an inlet opening adapted for receiving fluid from said fluid supply, valve means for controlling fluid flow through said by-pass fluid passage, first means for producing a force tending to open said valve responsive to fluid flow through said first fluid passage, second means for producing a force tending to close said valve responsive to fluid flow through said second fluid passage, said by-pass fluid passage defining an outlet communicating with one of said first and second fluid passages on one side of said flow responsive means associated with said one passage, said one side being the side closest to said consumption device when said control device is connected in said fluid supply system, and means are provided for measuring fluid flow through said by-pass passage.

19. A recirculating fluid supply system including means for measuring the rate of delivery of fluid thereby, comprising a reservoir, means for supplying fluid under pressure from said reservoir, delivery conduit means, discharge conduit means, branched conduit means forming parallel flow paths connected to said supply means and said discharge conduit, control means constructed and arranged for comparing the relative rate of flows at two locations in said supply system, one of said locations being in one of the branches of said branched conduit and the other of said locations being in said discharge conduit, said delivery conduit means being connected to receive fluid from one of said one branch conduit and said discharge conduit at a point between said two locations, valve means in the other branch of said branched conduit means for controlling the rate of fluid flow through said other branch, said control means being connected and arranged to control said valve means whereby fluid flow through said other branch is at a rate which equalizes said rates of flow at said two locations, and means for measuring the rate of flow through said other branch as a measure of the fluid flow through said delivery conduit means.

20. A system as recited in claim 19 in which said control means include a pair of orifices of equal area, one interposed in said supply path between connections thereof with said by-pass and delivery conduit mean and the other interposed in said discharge path between connections thereof with said by-pass conduit means and said reservoir, and said control means further including means for comparing the fluid pressure drops through said orifices.

21. In a by-pass flow control device for a recirculating fluid supply system in which fluid is supplied from a fluid source through a supply conduit to a fluid consumption device at a rate in excess of consumption and excess fluid is returned through a return conduit to the fluid source, said control device having a body member, a first fluid passage in said body member having inlet and outlet openings adapted for connection in said supply conduit, a second fluid passage in said body member having inlet and outlet openings adapted for connection in said return conduit, a by-pass fluid passage in said body member having an inlet opening for receiving fluid from said fluid supply, valve means for controlling fluid flow through said by-pass fluid passage, first means for producing a force responsive to fluid flow through said first fluid passage, second means for producing a force responsive to fluid flow through said second fluid passage, wherein the improvement comprises: said first force means applies its said force in a direction tending to open said valve means and said second force means applies its said force in a direction tending to close said valve means, and said by-pass fluid passage defines an outlet communicating with one of said first and second fluid passages on one side of said flow responsive means associated with said one passage, said one side being the side closest to said consumption device when said control device is connected in said fluid supply system.

References Cited

UNITED STATES PATENTS

| | | | |
|---|---|---|---|
| 2,265,961 | 12/1941 | Ziebolz | 137—100 |
| 2,361,478 | 10/1944 | Jennings | 137—100 |
| 2,769,337 | 11/1956 | Rich | 73—211 X |
| 3,147,797 | 9/1964 | Miner | 137—110 X |

JERRY W. MYRACLE, Primary Examiner

U.S. Cl. X.R.

137—99, 101, 110